United States Patent [19]
Koch et al.

[11] 3,876,188
[45] Apr. 8, 1975

[54] POLYURETHANE MIXING DEVICE

[75] Inventors: Friedrich Koch, Achim, Germany; Peter U. Graefe, Bricktown, N.J.

[73] Assignee: Desma-Werke G.m.b.H., Achim bei Bremen, Germany

[22] Filed: June 19, 1973

[21] Appl. No.: 371,490

[30] Foreign Application Priority Data
June 19, 1972 Germany.............................. 2229648

[52] U.S. Cl................................ 259/191; 425/208
[51] Int. Cl................................................ B29b 1/06
[58] Field of Search......... 259/191, 192, 193, 9, 10, 259/5, 6, 7, 25, 26, 97, 45, 46; 425/207, 208, 209

[56] References Cited
UNITED STATES PATENTS

| | | | |
|---|---|---|---|
| 2,680,879 | 6/1954 | Schnuck | 259/191 |
| 3,325,865 | 6/1967 | Dunnington | 259/191 |
| 3,671,141 | 6/1972 | Kovacs | 259/191 |
| 3,737,151 | 6/1973 | Schaeffer | 259/191 |
| 3,751,015 | 8/1973 | Hensen | 259/191 |

*Primary Examiner*—Robert W. Jenkins
*Attorney, Agent, or Firm*—Dike, Bronstein, Roberts, Cushman & Pfund

[57] ABSTRACT

Apparatus for mixing and conveying two or more plasticizable materials comprising a housing containing an elongate chamber of circular cross-section having a cylindrical conveyor portion into which the material is introduced, a cylindrical mixing portion into which the material is mixed and a conical discharge portion. A worm is mounted in the chamber on which there is a helical groove of uniform depth for rotation about a longitudinal axis of the chamber and on that portion of the worm in the mixing zone there is in addition to the helical groove one or more deviations in the periphery in the form of elevations on the surface of the worm or depressions in the surface of the worm which extend peripherally and/or axially thereof so that at the place of such deviation and gap between the interior of the chamber and the periphery of the worm is different from that where there are no such deviations.

10 Claims, 7 Drawing Figures

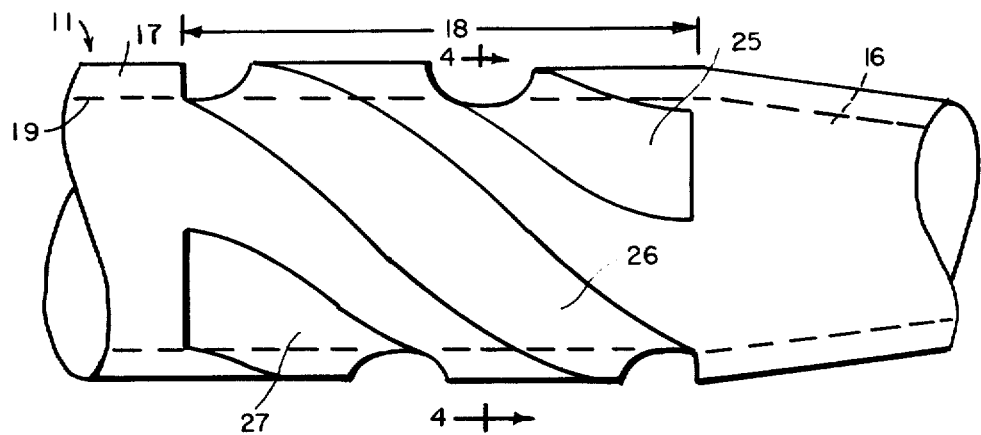
FIG.3
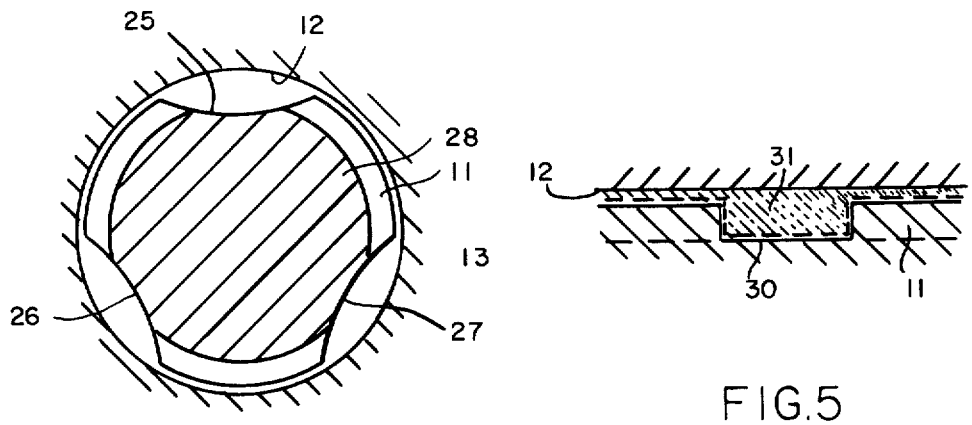
FIG.4
FIG.5
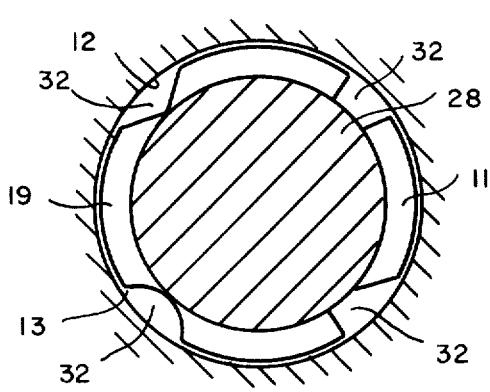
FIG.6
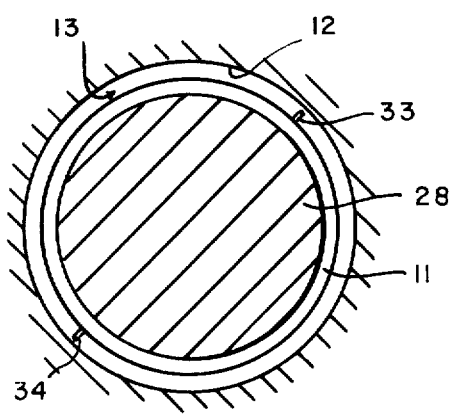
FIG.7

POLYURETHANE MIXING DEVICE

BACKGROUND OF THE INVENTION

This invention relates to an apparatus for the mixing and conveying of at least two liquid components, especially in the production of two-component polyurethanes, having a worm rotatable in a mixing chamber.

Such mixing and conveying apparatuses are conceived primarily as part of a casting or injection assemblage for the processing of synthetic plastic materials, especially polyurethanes, comprising two or more components. In these synthetic resins the object is that the separately supplied components should be intimately intermixed simultaneously with conveying in the mixing chamber. In practice it has proved difficult to fulfill both requirements, namely rapid conveying and good intermixing, in an optimum manner.

With an ordinarily centrally mounted worm in fact adequate conveying output is possible, but the mixing effect is unsatisfactory. In order to improve the intermixing of the components with such a worm, it has already been proposed to enlarge the distance between the outer contours of the worm and the inner surface of the mixing chamber wall (gap) in order to render possible a transference of the mixed material from one worm turn to the next. However, it has appeared that in such a mixing assemblage a film of material is built up in the mixing gap which has the result that the components are conveyed almost unmixed from the assemblage.

A similarly already known mixing apparatus is formed with a conically tapering worm and a correspondingly shaped mixing chamber on the exit side of the mixed material. The worm is in this case rotatable and axially displaceable. During mixing the worm is in a position drawn back from the exit side, in such a way that the distance between the worm and the conical wall of the mixing chamber is enlarged in the conical forward region of the mixing chamber. A reinforced intermixing of the components takes place in this conical gap of the mixing chamber. Then by axial displacement of the worm towards the exit side the mixed material collected on the wall of the conical region of the mixing chamber is conveyed away and discharged.

With such a mixing apparatus with conical worm an improved intermixing is achieved with likewise improved throughput. The output of such an assemblage is about 90 grams per second.

The invention is based upon the problem, in a mixing apparatus having at least one worm in a mixing chamber, of further increasing the output with improved intermixing of the components.

SUMMARY

To solve this problem the apparatus according to the invention is characterized in that in a mixing zone of the cylindrical mixing chamber between mixing chamber wall and worm or worm turn, locally varying different gap widths are formed by movement of the worm. The different gap widths in the mixing zone between the outer worm contour and the inside of the mixing chamber can be achieved in various ways, for example, by worm turns with regions of different radial dimensions, by worm cores having a cross-section departing from a circular area or by special raised portions and/or depressions on the worm turns.

The invention achieves the object that in a partial zone in the peripheral direction of the worm and also in its axial direction an increased interval is constantly produced between the outer worm contour and the mixing chamber wall, that is an enlarged gap width, which renders possible a reinforced transference of the components between the worm gaps and thus improved intermixing. The formation of a film of material on the inner side of the mixing chamber wall is avoided by the fact that the zones of enlarged gap width vary in position during the rotation of the worm continuously or by axial displacement, as intervals of time, so that such gatherings of material are removed again by subsequent zones with smaller distance between mixing chamber wall and worm.

The invention can be utilized advantageously in combination with a worm tapering conically towards the tip. With such a worm then by reason of the features in accordance with the invention all practical requirements are optimally fulfilled, namely delivery of the mixed material with adequate output, good intermixing of the components and jet stabilization on the exit side of the mixing chamber so that the mixed material issues more or less without energy.

The invention will be explained in greater detail hereinafter by reference to examples of the embodiment of the invention which are illustrated in the accompanying drawings wherein:

FIG. 3 shows an apparatus according to the invention with another form of embodiment of the worm, likewise in longitudinal elevation;

FIG. 4 shows a cross-section IV—IV of FIG. 3, likewise on an enlarged scale;

FIG. 5 shows a detail of another form of embodiment of a worm according to the invention in longitudinal section;

FIG. 6 shows a form of embodiment of a worm according to the invention with recesses in worm turns, in cross-section; and FIG. 7 shows a form of embodiment with attached raised portions on worm turns, likewise in cross-section.

The drawings concern mixing and delivery devices for several components, especially two, which are to be intermixed and delivered in the flowable condition. Primarily it is a matter of the production of multicomponent synthetic plastic materials, especially polyurethane. The apparatus consists of a stationary external housing 10 in which a worm 11 is rotatably and preferably axially displaceably mounted. The worm 11 is situated in a mixing chamber 13 formed by the wall 12 of the housing 10. Housing 10 and worm 11 are arranged in relation to one another so that as mixing chamber 13 there remains a gap between the external limitations of the worm 11 and the inner side of the mixing chamber wall 12.

Figure 1:
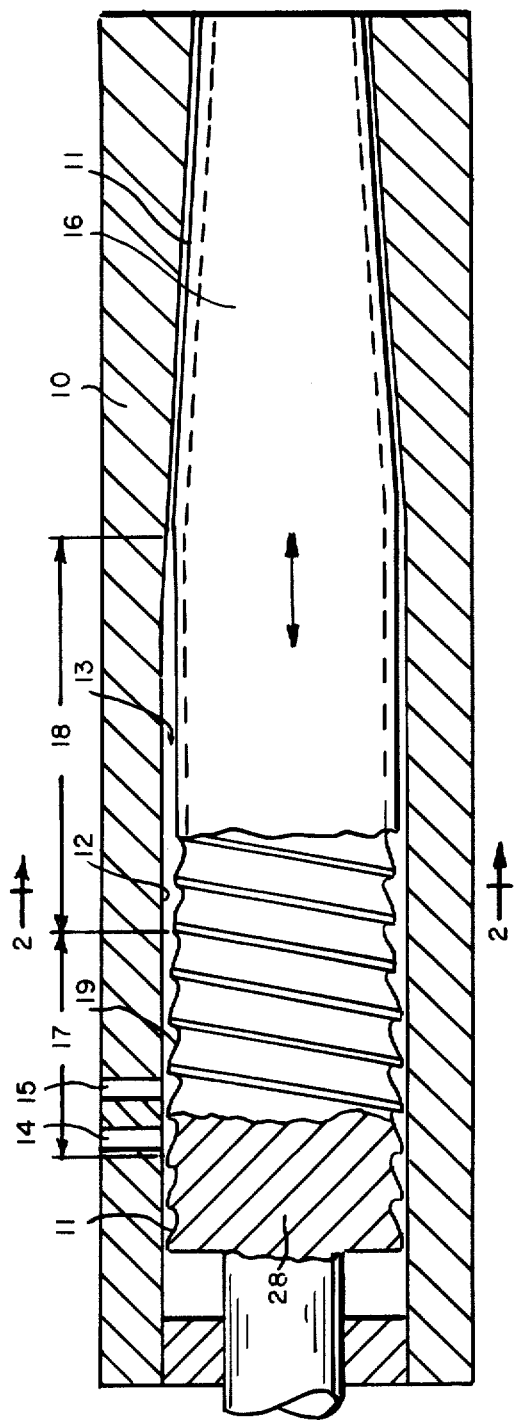
FIG. 1 shows an apparatus according to the invention in diagrammatic lateral elevation, partially in longitudinal section.

The components to be mixed with one another, two components in the example of embodiment as illustrated, are introduced into the mixing chamber 13 through corresponding component inlets 14 and 15 in a zone lying remote from the discharge end (on the right in FIG. 1).

As in the example of embodiment according to FIG. 1, the worm 11 is preferably equipped with a conical part 16 facing the discharge end. The mixing chamber 13 is likewise made conically tapering in this zone by appropriate conformation of the wall 12. With such a worm the procedure is adopted that in the preparation, namely mixing and conveying of the material, the worm works in a position (not shown) withdrawn before the discharge side. Thus in the region of the conical part 16 a greater gap width of the mixing chamber 13 is produced with the result that the mixed material delivered into this region is largely free from energy and can be discharged without energy (jet stabilization).

The worm 11 is specially formed. Firstly, a conveying zone 17 adjoins the component inlets 14 and 15 and serves for the predominant or exclusive conveying of the components with only slight mixing effect. The conveying zone 17 has approximately the length of one pitch.

The conveying zone 17 is followed by a mixing zone 18 which in the form of embodiment according to FIG. 1 extends at least partially into the zone of the conical part 16. This mixing zone 18 guarantees improved intermixing of the components without substantial detriment to the conveying effect. For this purpose the worm 11 is specially conformed in this mixing zone 18.

In principle the object is that in the mixing zone 18 there are one or more zones of greater distance of the worm contour from the inner side of the mixing chamber wall 12 (gap width). This zone or these zones of greater gap width here vary in location by movement of the worm 10, namely either by its rotation or by its axial displacement, so that material accumulations forming momentarily in the zone of this greater gap width are subsequently eliminated again. The greater gap width insures intensive intermixing of the components.

Figure 2:
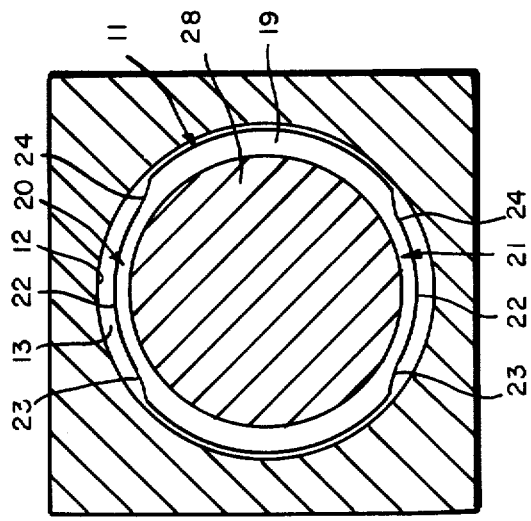
FIG. 2 shows a cross-section II—II of FIG. 1 on an enlarged scale.

In the form of embodiment according to FIGS. 1 and 2 the worm turn 19 (or the worm turns in the case of a multi-start form of embodiment) has a smaller radial dimension by the removal of material of the worm turn in partial zones of the periphery. As may be seen especially from FIG. 2, here two mutually opposite "flattenings" 20 and 21 of the worm spiral 19 are formed. These flattenings 20 and 21 lie opposite to one another. In the peripheral direction these flattenings 20 and 21 are formed so that an arcuate section 22 lying symmetrically of its longitudinal center plane runs out towards the sides with rectilinear junctions 23 and 24. The zone of the worm 11 thus formed, that is the mixing zone 18, extends in the axial direction into the conical part 16, namely due to the fact that the flattenings 20 and 21 are conducted in the longitudinal direction of the worm rectilinearly or parallel with the worm axis until they run out in a conical part 16.

By the flattenings 20 and 21 larger gap widths are formed in this zone between the worm turn 19 and the mixing chamber wall 12. These enlarged "mixing spaces" travel in the peripheral direction in the mixing chamber 13 in conformity with the rotation of the worm 11, so that lasting material accumulations cannot occur, but the material is constantly removed by the subsequent zones of the worm turn 19 with unchanged radial height.

In the form of embodiment according to FIGS. 3 and 4 the material exchange over the worm turns 19 is achieved otherwise in the mixing zone 18, namely by several — here three — trough-like depressions 25, 26, 27 distributed over the periphery in cross-section. These depressions 25, 26, 27 can extend merely in the region of the worm turns 19 or — as in the example of embodiment as illustrated — into the zone of the worm core 28. The depressions 25, 26, 27, which here likewise terminate in the conical part 16 of the worm 11, are wound helically in the example of embodiment as shown, but with greater pitch than the worm turns 19.

In this form of embodiment according to FIGS. 3 and 4 again zones with greater and smaller gap width likewise rotating in the peripheral direction occur between worm 11 and mixing chamber wall 12. A transference of material and thus good intermixing are thereby rendered possible, on the other hand long-lasting material accumulations are avoided.

In the form of embodiment according to FIG. 5 a preferably peripherally surrounding recess 30 is formed in the worm 11. In the example of embodiment as represented this recess 30 extends as far as the surface of the worm core 28. This recess 30 likewise renders possible good intermixing of the components by transference of material over the worm turns 19. A material accumulation 31 forming in the region of the recess 30 during the rotation of the worm 11 is removed again on subsequent axial displacement of the correspondingly formed worm 11. Several such recesses 31 can be provided in the mixing zone of the worm.

In the form of embodiment according to FIG. 6, apertures 32 are provided in the worm turn 19. These apertures 32 can, according to the desired effect, be of larger or smaller dimensions, affect only a part of the worm turn 19 in height or extend to the worm core. Interruptions of the worm turn 19 can also be provided. In this form of embodiment the region of greater gap width travels in the peripheral direction of the mixing chamber 13 during the rotation of the worm 11.

Finally FIG. 7 shows a variant in which driver pieces 33 and 34 in the form of webs are provided on the worm turn 19. These driver pieces 33 and 34, which may possibly have a helical course, with a pitch greater than that of the worm turns 19, have a slight distance from the inner side of the mixing chamber wall 12, that is to say leave only a narrow gap free. Outside the zone of the driving pieces 33 and 34 on the other hand there is a greater gap width which renders possible the desired mixing of the components by transference over the worm turn 19.

It should be understood that the present disclosure is for the purpose of illustration only and that this invention includes all modifications and equivalents which fall within the scope of the appended claims.

What I claim is:

1. Apparatus for mixing and conveying material delivered thereto comprising a housing containing an elongate chamber of circular cross-section, said housing having near one end an opening through which the material is introduced into the chamber, and a worm having a helical groove consisting of ridges and channels on its peripheral surface extending lengthwise thereof, said worm being supported in concentric relation to the chamber for rotation therein about the longitudinal center line of the chamber with a gap between the peripheral surface of the worm and the interior of the chamber; characterized in that the peripheral surface of the ridges of the worm contains in addition to the helical groove constituting the worm diametrically disposed parallel flattenings over an axial portion of said ridges in the surface such that the gap between the surface of the worm and the interior of the chamber at the places of such flattenings is different than at the places where there are no such flattenings.

2. Apparatus according to claim 1, wherein the worm is supported in the chamber for axial movement therein.

3. Apparatus according to claim 1, wherein there are two diametrically disposed flattened areas in the mixing zone in which the depth of the helical groove in said flattened areas is less than in the portions of the periphery intermediate the flattened areas.

4. Apparatus according to claim 1, wherein the flattened areas comprise an arcuate part extending peripherally of the worm at a lesser distance from the axis of the worm than the peripheral surface thereof and flat rectilinear parts extending from the ends of the arcuate part to the peripheral surface of the worm.

5. Apparatus for mixing and conveying material delivered thereto comprising a housing containing an elongate chamber of circular cross-section, said housing having near one end an opening through which material is introduced into the chamber, said chamber embodying axially situated zones comprising a conveyor zone and a mixing zone, said conveyor zone containing said opening, and a worm having a helically arranged groove consisting of ridges and channels on its peripheral surface supported in concentric relation to the axis of the chamber for rotation therein; characterized in that in the region of the mixing zone the worm has in addition to the helical groove therein diametrically disposed parallel flattenings over an axial portion of said ridges in the surface such that the gap between the surface of the worm and the interior of the chamber in the mixing zone at the place of said flattenings is different from that at the place where there are no such flattings.

6. Apparatus according to claim 5, wherein the chamber beyond the mixing zone in the direction of movement of the material through the chamber is conical and that part of the worm in the conical portion of the chamber is correspondingly conical, and wherein the flattened portions extend along the worm into the conical portion.

7. Apparatus for mixing and conveying material delivered thereto comprising a housing containing an elongate chamber of circular cross-section, said housing having near one end an opening through which material is introduced into the chamber and a worm having a helical groove consisting of ridges and channels in its peripheral surface supported in concentric relation to the chamber for rotation about its longitudinal axis; said chamber having conveying and mixing zones, and said conveying zone containing said opening characterized in that in the mixing zone the worm has an axial procession of depressions of predetermined arcuate length in the tops of successive ridges providing a continuous gap between the interior of the chamber and the surface of the worm at the place of the depression which is greater than that where there are no such depressions.

8. Apparatus for mixing and conveying material delivered thereto comprising a housing containing an elongate chamber of circular cross-section, said housing having near one end an opening through which material is introduced into the chamber and embodying axially situated zones comprising a conveyor zone and a mixing zone, said conveyor zone containing said openings and a worm having a helical groove of uniform depth lengthwise thereof consisting of ridges and channels on the peripheral surface of the worm, said worm being supported in the chamber in concentric relation to the longitudinal axis of the chamber with a clearance gap between the surface of the worm and the wall of the chamber for rotation about its longitudinal axis characterized in that successive ridges along that portion of the worm situated in the mixing zone contain arcuate depressions of predetermined length located at corresponding peripheral portions of the worm such that they collectively define a continuous gap of predetermined arcuate and axial length between the interior of the chamber and the worm which is greater than that between the chamber and the worm where there are no such depressions.

9. Apparatus for mixing and conveying material delivered thereto comprising a housing containing an elongate chamber of circular cross-section, said housing having near one end an opening through which material is introduced into the chamber, and a worm having a helical groove of uniform depth supported in the chamber in concentric relation to the axis of the chamber with a clearance between the surface of the worm and the interior wall of the chamber for rotation about the longitudinal axis of the chamber, said helical grooves consisting of ridges and channels; characterized in that the ridges contain arcuate depressions of equal arcuate length located at corresponding peripheral portions on the worm such that the depth of the channel within the area of the depressions and the gap between the interior of the chamber and the tops of the ridges in said area are greater than the gaps between the interior of the chamber and the bottoms of the channels and the tops of the ridges where the ridges contain no such depressions.

10. Apparatus for mixing and conveying material delivered thereto comprising a housing containing an elongate chamber of circular cross-section, said housing having near one end an opening through which material is introduced into the chamber, and a worm having a helical groove of uniform depth extending lengthwise thereof, said worm being supported in the chamber in concentric relation thereto for rotation about a longitudinal axis of the chamber, said chamber comprising a conveying zone and a mixing zone and said conveying zone containing an opening, characterized in that the portion of the worm in the mixing zone contains symmetrically located depressed areas of predetermined arcuate and axial lengths providing continuous gaps in said areas between the interior of the chamber and the worm which are greater than the gaps between the interior of the chamber and the surface of the worm where there are no such depressions.

* * * * *